UNITED STATES PATENT OFFICE.

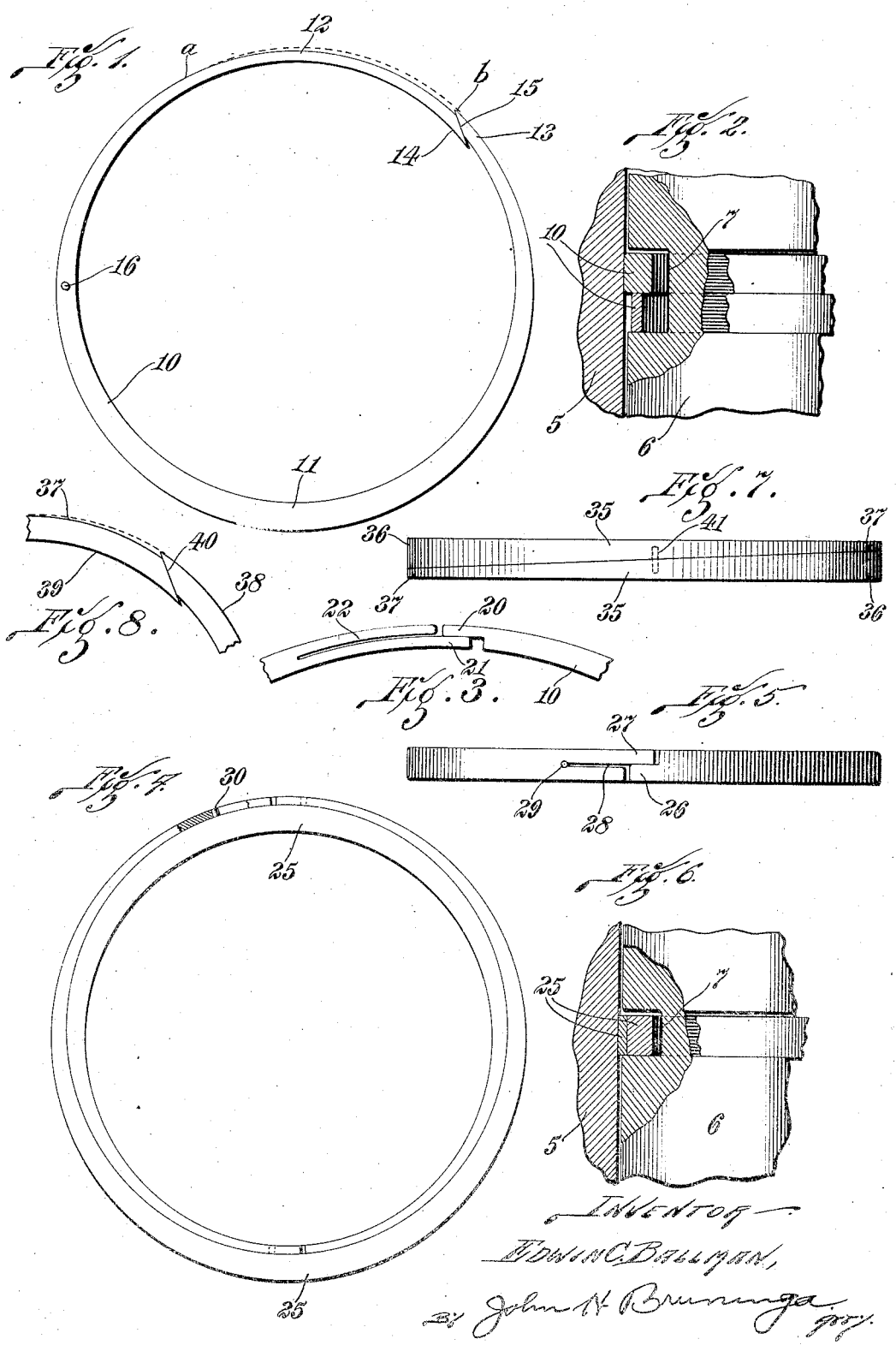

EDWIN C. BALLMAN, OF KIRKWOOD, MISSOURI.

PISTON-RING.

1,369,075.   Specification of Letters Patent.   Patented Feb. 22, 1921.

Application filed April 21, 1915. Serial No. 22,918.

*To all whom it may concern:*

Be it known that I, EDWIN C. BALLMAN, a citizen of the United States, and residing at Kirkwood, in the county of St. Louis and State of Missouri, have invented a certain new and useful Improvement in Piston-Rings, of which the following is a specification.

This invention relates to packing rings, and more particularly, to packing rings for pistons.

In all types of packing rings as heretofore constructed there is always a small leakage through the slit or break in the ring. This is on account of the construction of the ring. In the process of making such a ring as heretofore practised, a ring is first turned to a slightly larger diameter than the inside of the cylinder, then slotted, then clamped on a mandrel, so that the slot closes, and turned and ground down to the inside diameter of the cylinder. In the complete ring, the length is, however, that of the inside circumference of the cylinder, and, therefore, if all parts are to exact dimensions, the ends of the ring will just come together. The ends will, however, just come together only for the smallest diameter of the cylinder, and when the cylinder is cold. For variations in the cylinder diameter, however, and when the cylinder is hot, the ends will, of course, separate, thereby causing the leakage at the joint.

One of the objects of this invention, therefore, is to provide a packing which is tight both axially and circumferentially.

Another object is to provide a ring, the ends of which are held in yielding engagement, irrespective of the diameter and the condition of the cylinder.

Further objects will appear from the detail description taken in connection with the accompanying drawing, in which:

Figure 1 is an end view of a packing ring embodying this invention, the ring being shown in full lines in working position;

Fig. 2 is a detail section through a cylinder, showing the packing in position;

Fig. 3 is a detail, showing another embodiment of this invention;

Fig. 4 is a view similar to Fig. 1, showing still another embodiment of this invention;

Fig. 5 is a side view of one of the rings;

Fig. 6 is a view similar to Fig. 2, but showing the packing illustrated in Figs. 4 and 5;

Fig. 7 is a view similar to Fig. 5, but showing still another embodiment of this invention; and Fig. 8 is a detail side view of one of the rings shown in Fig. 7.

Referring to the accompanying drawing, and more particularly, to Figs. 1 and 2, 10 designates a ring which decreases in thickness radially from one side 11 to the other side 12, the thickest part being at 11, and the thinnest part at 12. This ring is split to one side of the thinnest portion, and the ends 13 and 14 are lapped to form a lap or scarf joint 15.

The application of such a packing is shown in Fig. 2, in which 5 designates the cylinder, 6 the piston and 7 the groove in the piston adapted to receive the packing. In practice, two packing rings 10 are placed side by side in the groove, and so arranged that the joint in one ring will come diametrically opposite to the joint in the other ring, the rings being held together by a pin 16 in one ring engaging an aperture in the other ring.

The ring is so constructed that its diameter, when complete, will be slightly larger than the inside diameter of the cylinder. This will cause the end 14 to underlap the end 13, so that the end 14 will be held out of engagement with the cylinder wall from about the point a to about the point b. Since the weakest section is to one side of the joint, and to that side which underlaps, and since the section is reduced to that side of the joint, the underlapping part is held in yielding engagement with the overlapping end by the inherent resiliency of the ring, and by the fluid pressure. The result is that the ends of the ring are always held in engagement to close the joint, and this engagement is closer the greater the pressure of the gas inside of the cylinder, and, therefore, back of the ring. Moreover, the joint remains tight for a variation in the diameter. Since the contacting faces of the joints are pressing together, there can be no leakage diametrically, and axially the leakage is prevented by the engagement of the rings with each other and with the wall of the cylinder.

This action of the ring will be clear from a description of its construction and method of manufacture. In the manufacture of piston rings, as is well known to those skilled in the art, the ring blank is turned to a diameter a fraction of an inch greater than the cylinder in which it is to be used; a piece is then cut out of the ring, the ring is then contracted so that the spaced ends meet, and in such a position is placed on a mandrel and turned down to the correct diameter, that is, to the diameter of the cylinder; this will produce a ring which has the requisite tension, as the ends will tend to spring apart. Now in accordance with this invention, the same general procedure is followed. The ring blank is turned to a diameter greater than the diameter of the cylinder in which the ring is to be used; in this case, however, the piece taken out of the ring is to one side of its thinnest section 12, Fig. 1; the ring is now contracted to a diameter slightly greater than that of the cylinder in which it is to be used, the piece taken out of the ring being so calculated that when the ring blank is so contracted, the end a—b will occupy about the dotted position shown in Fig. 1; the ring is now turned down to the diameter slightly greater than the diameter of the cylinder. If now the ring is placed in a cylinder of the correct diameter, for which the ring is designed, the ends will be in the position shown in full lines, Fig. 1, in which the underlapping end will be held out of contact with the cylinder wall for some distance, as shown, the cylinder wall being shown by the dotted line from a to b. This will hold the lapped ends in close and firm engagement when the ring is in use in the cylinder, as previously described. It will, of course, be understood that the conditions are exaggerated in Fig. 1, as it will be seen that a slight swinging movement of the ring sections b—a toward the cylinder surface, will compensate for quite a gap between the lapped ends. The leakage between the sections a—b, and the cylinder wall, will, therefore, be very slight; moreover, this leakage is entirely overcome by placing two ring sections in 180° spaced relation, as shown clearly in Fig. 2.

Fig. 3 shows another embodiment of this invention, in which a lapped joint is formed by an overlapping end 20 and an underlapping end 21. To increase the resiliency at the joint on the underlapping end, this end is slit circumferentially, as shown at 22, so that the end 21 will always remain in engagement with the end 20, as the part above the slot 22 can press inwardly without affecting the part 21. It will, of course, be understood that the action is obtained in a manner similar to that described in the manufacture of the embodiment shown in Fig. 1. The ring blank is in this case also turned to a diameter somewhat greater than the diameter of the cylinder in which the ring is to be used; a piece is then cut out of the ring, the ends lapped and the kerf 22 formed. If now such a ring is contracted to a diameter slightly greater than the cylinder in which the ring is to be used, the pressure of the overlapping end on the underlapping end, will tend to force the portion 21 of the underlapping end away from the portion immediately above the kerf. If now the ring is turned on a mandrel to the true diameter of the cylinder for which the ring is designed, the lapped ends are maintained in firm sealing engagement, and this sealing engagement is maintained when the portion above the kerf is in engagement with the cylinder wall, since this portion can yield independently of the underlapping end, without throwing the underlapping end out of engagement with the overlapping end. In this case also the ends 21 and 20 are held in yielding engagement by the inherent elasticity of the ring, and also by the gas pressure inside of the cylinder and back of the ring. The joint may, in this case, be at the thinnest or weakest part of the ring, as shown in Fig. 3, but may be at one side, as shown in Fig. 1, and, in this case, also, two rings may be placed side by side breaking joints.

In the construction shown in Figs. 4, 5 and 6, two rings 25 are slipped over one another and lapped axially, so as to form overlapping ends 26 and 27. In this case, one end 27 is slit as shown at 28 and apertured as shown at 29, so as to weaken this part of the ring, and, therefore, maintain a yielding engagement of the ends 26 and 27. This is accomplished in the manufacture of the ring in a manner similar to that heretofore described with the embodiment shown in Figs. 1 and 3. The ring blank is, of course, of a width slightly greater than its final width. After the piece has been cut out of the blank, the lapped ends are formed, so that when they are brought together, they will be held in firm engagement; for in view of the fact that these ends are formed independently, their engaging surfaces can be so formed as to require a lateral springing of the ring when they are brought together. When, therefore, the ring is afterward machined to its true width, these ends will be maintained in firm engagement, for the engagement of the ring portion on the other side of the kerf from the portion 27, will not throw the lapped ends out of engagement, as the free portion can yield independently. In this case, one ring is slipped over the other, so as to break joints, and each ring is provided with a pin 30 engaging the aperture 29 in the other ring.

Instead of making the ring of a varying thickness radially from its center toward its ends, in order to provide for a uniform pressure on the cylinder wall, the thickness may be made varying axially, as shown in Figs.

7 and 8. In these figures the rings 35 are made on an oblique section, with the thickest part at 36 and the thinnest part at 37, two of these rings being placed side by side to form the complete packing, with the thinnest part of one ring opposite the thickest part of the other ring. The joint is, in this case, also made to one side of the thinnest section, the end 39 underlapping the end 38, so as to form a lap or scarf joint 40. The rings are pinned together by a pin 41. The action of this ring is substantially the same as that shown in Figs. 1 and 2, and further description will, therefore, be unnecessary.

The advantageous features described in connection with Figs. 1 and 2 also apply to the other embodiments of this invention. It will be seen that, in accordance with this invention, a tight joint is formed, both axially and diametrically, irrespective of variations in the diameter of the cylinder, and irrespective of the conditions of the cylinder. This is brought about by causing the ends of the ring always to bear against one another, instead of both bearing against the cylinder wall, and this is obtained by keeping one end out of engagement with the cylinder wall, and by weakening the underlapping section adjacent the joint. The resiliency of the ends is, therefore, increased. As the packing is self-adjustable, the parts do not have to fit snug in the groove of the piston, so that they will not, therefore, be easily affected by oil, etc.

It is obvious that various changes may be made in the details of the construction without departing from the spirit of this invention. It is, therefore, to be understood that this invention is not to be limited to the specific construction shown and described.

Having thus described the invention, what is claimed is:

1. A packing ring having lapped ends forming a joint, the ring having its underlapping section weakest to one side of the joint and adapted to flex at its weakest point so as to maintain the underlapping end in continuous contact with the overlapping end at the joint.

2. A packing ring having lapped ends, with one end lapping the other end to form a joint, a portion of the ring at one side of one lapping end being constructed for independent movement toward the opposed lapping portion, when the ring is in use.

3. A packing ring having lapped ends, with one end lapping the other end to form a joint, said ring having a circumferential kerf formed in one of its ends at one side of the joint, the portions of the ring at opposite sides of said kerf being independently yieldable.

4. A packing ring having lapped ends forming a joint, the underlapping end having a weakened section extending to one side of the joint and adapted to bear lightly on the cylinder wall, whereby said underlapping end may yield relatively to the overlapping end, when the ring is in use in a cylinder.

In testimony whereof I affix my signature this 7th day of April, 1915.

EDWIN C. BALLMAN.